(12) United States Patent
Eckert

(10) Patent No.: US 8,157,165 B2
(45) Date of Patent: *Apr. 17, 2012

(54) USER SELECTABLE FUNCTIONALITY FACILITATOR

(75) Inventor: Daniel J. Eckert, Chicago, IL (US)

(73) Assignee: HSBC Card Services Inc., Mettawa, IL (US)

( * ) Notice: Subject to any disclaimer, the term of this patent is extended or adjusted under 35 U.S.C. 154(b) by 408 days.

This patent is subject to a terminal disclaimer.

(21) Appl. No.: 12/501,313

(22) Filed: Jul. 10, 2009

(65) Prior Publication Data

US 2009/0292607 A1   Nov. 26, 2009

Related U.S. Application Data

(63) Continuation of application No. 11/496,497, filed on Aug. 1, 2006, now Pat. No. 7,591,419.

(60) Provisional application No. 60/786,382, filed on Mar. 28, 2006, provisional application No. 60/796,540, filed on May 2, 2006.

(51) Int. Cl.
*G06K 5/00* (2006.01)

(52) U.S. Cl. ........................ 235/380; 235/383

(58) Field of Classification Search .................. 235/380, 235/375, 383, 382, 492, 379
See application file for complete search history.

(56) References Cited

U.S. PATENT DOCUMENTS

| | | |
|---|---|---|
| 4,001,550 A | 1/1977 | Schatz |
| 4,256,955 A | 3/1981 | Giraud et al. |
| 4,755,660 A | 7/1988 | Nakano et al. |
| 4,900,903 A | 2/1990 | Wright et al. |
| 4,908,499 A | 3/1990 | Guion et al. |
| 4,928,001 A | 5/1990 | Masada et al. |
| 4,992,646 A | 2/1991 | Collin et al. |
| 5,097,115 A | 3/1992 | Ogasawara et al. |
| 5,168,151 A | 12/1992 | Nara et al. |
| 5,352,875 A | 10/1994 | Enomoto et al. |
| 5,473,690 A | 12/1995 | Grimonprez et al. |
| 5,530,232 A | 6/1996 | Taylor |

(Continued)

FOREIGN PATENT DOCUMENTS

JP   5174249   7/1993

(Continued)

OTHER PUBLICATIONS

Office Action mailed Jan. 25, 2010 from USPTO for U.S. Appl. No. 11/496,495.

(Continued)

*Primary Examiner* — Thien M Le
(74) *Attorney, Agent, or Firm* — Faegre Baker Daniels LLP

(57) ABSTRACT

Embodiments of the present invention provide a user station or input medium allowing a user to view available functions and to enter selection information for requesting the association of one or more functions with a user operation vehicle. A verifier, responsive to the user station or input medium, can be provided to determine based upon a set of pre-determined rules, whether the user is entitled to the selected functions. A linkage generator can be provided to associate a user operation vehicle with the selected functions after they have been verified by the verifier. A reward function may also be combined with one or more of the functions associated with the user operation vehicle. Interoperability can also be provided between functions on a user operation vehicle based on a pre-determined set of rules. The interoperability between functions may be bidirectional.

59 Claims, 10 Drawing Sheets

U.S. PATENT DOCUMENTS

| | | | |
|---|---|---|---|
| 5,557,518 A | 9/1996 | Rosen | |
| 5,574,269 A | 11/1996 | Mori et al. | |
| 5,649,118 A | 7/1997 | Carlisle et al. | |
| 5,699,528 A | 12/1997 | Hogan | |
| 5,729,717 A | 3/1998 | Tamada et al. | |
| 5,748,737 A | 5/1998 | Daggar | |
| 5,887,064 A | 3/1999 | Seysen et al. | |
| 5,959,277 A * | 9/1999 | Lucero | 235/380 |
| 5,991,749 A | 11/1999 | Morrill, Jr. | |
| 6,032,136 A | 2/2000 | Brake, Jr. | |
| 6,065,675 A | 5/2000 | Teicher et al. | |
| RE36,788 E | 7/2000 | Mansvelt et al. | |
| 6,085,976 A * | 7/2000 | Sehr | 235/384 |
| 6,179,205 B1 | 1/2001 | Sloan | |
| 6,220,510 B1 | 4/2001 | Everett et al. | |
| 6,233,683 B1 | 5/2001 | Chan et al. | |
| 6,327,573 B1 | 12/2001 | Walker | |
| 6,367,011 B1 | 4/2002 | Lee et al. | |
| 6,402,028 B1 | 6/2002 | Graham, Jr. et al. | |
| 6,421,729 B1 | 7/2002 | Paltenghe et al. | |
| 6,427,909 B1 | 8/2002 | Barnes et al. | |
| 6,431,443 B1 | 8/2002 | Barnes et al. | |
| 6,434,534 B1 | 8/2002 | Walker et al. | |
| 6,450,407 B1 | 9/2002 | Freeman et al. | |
| 6,505,772 B1 | 1/2003 | Mollett et al. | |
| 6,549,912 B1 | 4/2003 | Chen | |
| 6,845,906 B2 | 1/2005 | Royer et al. | |
| 6,865,547 B1 | 3/2005 | Brake, Jr. et al. | |
| 6,882,984 B1 | 4/2005 | Boyle et al. | |
| 6,886,741 B1 | 5/2005 | Salveson | |
| 6,957,776 B1 | 10/2005 | Ng | |
| 7,072,864 B2 | 7/2006 | Brake, Jr. et al. | |
| 7,134,087 B2 | 11/2006 | Bushold et al. | |
| 7,225,156 B2 | 5/2007 | Fisher | |
| 7,240,364 B1 * | 7/2007 | Branscomb et al. | 726/9 |
| 7,263,507 B1 | 8/2007 | Brake, Jr. et al. | |
| 7,318,049 B2 * | 1/2008 | Iannacci | 705/39 |
| 7,591,419 B2 * | 9/2009 | Eckert | 235/380 |
| 7,860,789 B2 * | 12/2010 | Hirka et al. | 705/39 |
| 2001/0011248 A1 | 8/2001 | Himmel et al. | |
| 2001/0032878 A1 | 10/2001 | Tsiounis | |
| 2002/0013728 A1 | 1/2002 | Wilkman | |
| 2002/0026394 A1 | 2/2002 | Savage et al. | |
| 2002/0032609 A1 | 3/2002 | Wilkman | |
| 2002/0040344 A1 | 4/2002 | Preiser | |
| 2002/0052841 A1 | 5/2002 | Guthrie et al. | |
| 2002/0065712 A1 | 5/2002 | Kawan | |
| 2002/0107797 A1 | 8/2002 | Combaluzier | |
| 2002/0143709 A1 | 10/2002 | Diveley | |
| 2002/0188509 A1 | 12/2002 | Ariff | |
| 2003/0036950 A1 | 2/2003 | Nguyen | |
| 2003/0061093 A1 | 3/2003 | Todd | |
| 2003/0088462 A1 | 5/2003 | Carrithers et al. | |
| 2003/0101131 A1 | 5/2003 | Warren | |
| 2003/0212595 A1 | 11/2003 | Antonucci | |
| 2003/0236704 A1 | 12/2003 | Antonucci | |
| 2003/0236747 A1 | 12/2003 | Sager | |
| 2004/0122736 A1 | 6/2004 | Strock | |
| 2004/0155101 A1 | 8/2004 | Royer et al. | |
| 2004/0215507 A1 | 10/2004 | Levitt | |
| 2004/0249753 A1 | 12/2004 | Blinn et al. | |
| 2004/0254891 A1 | 12/2004 | Blinn et al. | |
| 2004/0260647 A1 | 12/2004 | Blinn et al. | |
| 2005/0055296 A1 | 3/2005 | Hattersley et al. | |
| 2005/0133590 A1 | 6/2005 | Rettenmyer | |
| 2005/0171898 A1 | 8/2005 | Bishop et al. | |
| 2005/0184146 A1 | 8/2005 | Hoch | |
| 2005/0211765 A1 | 9/2005 | Brown et al. | |
| 2005/0234820 A1 | 10/2005 | MacKouse | |
| 2006/0010033 A1 | 1/2006 | Thomas | |
| 2006/0106691 A1 | 5/2006 | Sheaffer | |
| 2006/0224449 A1 | 10/2006 | Byerley | |
| 2006/0259390 A1 | 11/2006 | Rosenberger | |
| 2006/0261144 A1 | 11/2006 | Foss | |
| 2006/0271432 A1 | 11/2006 | Sickel | |
| 2007/0150411 A1 | 6/2007 | Addepalli | |
| 2007/0168282 A1 | 7/2007 | Giordano | |
| 2007/0228156 A1 | 10/2007 | Eckert | |
| 2007/0228157 A1 | 10/2007 | Eckert | |
| 2008/0010189 A1 | 1/2008 | Rosenberger | |
| 2008/0097857 A1 | 4/2008 | Walker | |
| 2008/0126145 A1 | 5/2008 | Rackley, III et al. | |
| 2009/0018916 A1 | 1/2009 | Seven et al. | |
| 2010/0042517 A1 | 2/2010 | Paintin et al. | |
| 2010/0145861 A1 | 6/2010 | Law et al. | |
| 2010/0251008 A1 | 9/2010 | Swildens | |
| 2011/0168775 A1 * | 7/2011 | Van Zetten | 235/381 |

FOREIGN PATENT DOCUMENTS

| | | |
|---|---|---|
| WO | WO0104851 | 1/2001 |
| WO | 0214985 A2 | 2/2002 |
| WO | WO2007126936 | 11/2007 |
| WO | WO2008016398 | 2/2008 |

OTHER PUBLICATIONS

International Search Report and Written Opinion, PCT/US07/07743, May 2, 2008.
Office Action dated May 5, 2008 for U.S. Appl. No. 11/496,497.
Office Action dated May 29, 2008 for U.S. Appl. No. 11/496,495.
International Search Report and Written Opinion, PCT/US07/07740, Jul. 2, 2008.
International Preliminary Report on Patentability for PCT Application No. PCT/US2007/007740 dated Oct. 9, 2008.
Office Action dated Dec. 10, 2008 for U.S. Appl. No. 11/496,495.
Notice of Allowance dated Jan. 5, 2009 for U.S. Appl. No. 11/496,497.
International Preliminary Report on Patentability for PCT Application No. PCT/US2007/007743 dated Feb. 12, 2009.
Notice of Allowance dated May 6, 2009 for U.S. Appl. No. 11/496,497.
Office Action mailed Jul. 9, 2009 from USPTO for U.S. Appl. No. 11/496,495.
Bielski, L. "Enter the "supermarket card" —Is the much maligned chip card headed for a growth spurt?" ABA Banking Journal, vol. 91, No. 6, pp. 56, 58 and 60 (1999).
Bowry, K. "Smart Cards Get Clever Applications" Telecommunications, vol. 27, Issue 11, p. 47-49 (1993).
Bright, R. "Into a 3rd Generation—Active Card", Smart Card '88: International Conference and Workshop on Smart Card Applications and Technologies, p. 6 (1988).
Coleman, L. "Smart Card, Coupon Eater Targeted to Grocery Retailers" Marketing News, vol. 22, No. 12, p. 1 (1988).
Cross, R. "Smart cards for the intelligent shopper" Direct Marketing, vol. 58, No. 12, pp. 30-34 (1996).
Deverell, P. "The Smart Choice" Telecommunications, Dedham, vol. 27, Issue 3, p. 57-59 (1993).
Ferguson, Rick "Using private label credit cards as a loyalty tool," Journal of Consumer Marketing, 2006, vol. 23, No. 7, pp. 374-378.
Hong, et al. "Design and implementation of the system provide of the loyalty service for electronic commerce" Journal of Kiss (C) (Computing Practices), vol. 6, No. 3 (2000).
Iovacchini, A. "Smart Cards Offer Capability of a PC in Your Pocket" Bank Systems and Equipments, vol. 22, No. 7, pp. 94-98 (1985).
Lucas, P. "Another Chance for Chip Cards" Credit Card Management, New York, vol. 6, Issue 6, pp. 30-39 (1993).
Madan, M.S. et al. "Data Processing Aspects of the Integrated Circuit and Magnet Strip Cards" Information & Management, Amsterdam, vol. 22, Issue 1, pp. 41-52 (1992).
"NCR, AT&T Usher in Smart ATM Technology" Computerworld, Framingham, vol. 26, Issue 50, p. 24 (1992).
"Pocket Computer's Potential Power" Accountancy, London, vol. 105, Issue 1161, p. 128 (1990).
Svigals, J. "Here Comes the Multipurpose Card" American Bander, vol. 157, Issue 50, p. 4 (1992).
"The Future of Bankcard Authorization: Providing Incentives With Frequency Programs" Chain Store Age Executive with Shopping Center Age, vol. 69, Issue 10, Sec. 1, pp. 86-87 (1993).
Woodside, B. et al. "A Multi Application Contactless Smart Card Applied to Metering" Sixth International Conference on Metering Apparatus and Tariffs for Electricity Supply (Conf. Publ. No. 317), Manchester, UK (1990).

* cited by examiner

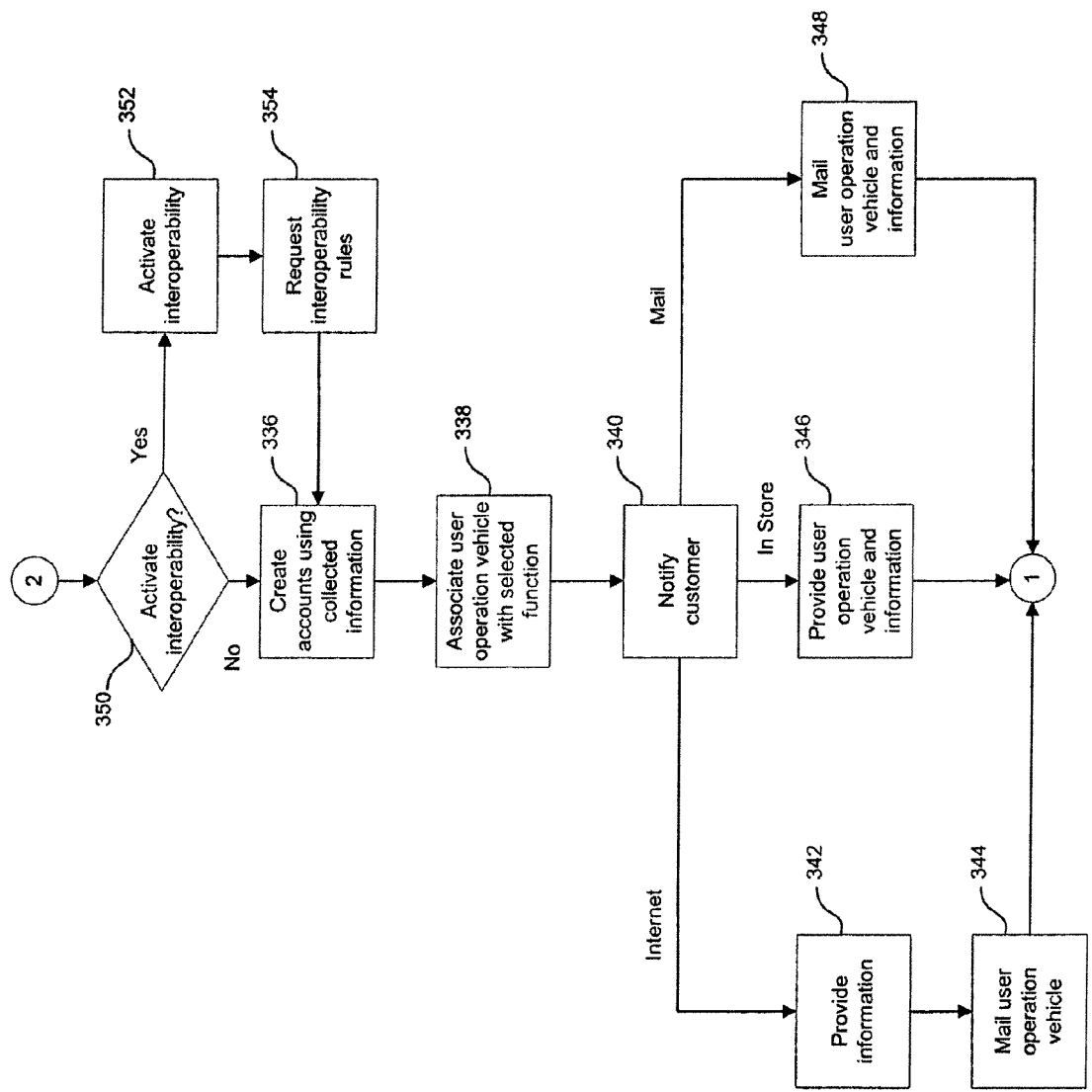

USER SELECTABLE FUNCTIONALITY FACILITATOR

CROSS-REFERENCE TO RELATED APPLICATION

This application is a continuation of U.S. patent application Ser. No. 11/496,497 filed on Aug. 1, 2006, entitled "User Selectable Functionality Facilitator," currently pending, which claims the benefit under 35 U.S.C. §119(e) of U.S. Provisional Patent Application No. 60/786,382, filed on Mar. 28, 2006, entitled "A Purchase System, Method And Medium With User Selectable Functionality And Interoperability," and U.S. Provisional Patent Application No. 60/796,540, filed on May 2, 2006, entitled "User Selectable Functionality And Interoperability Facilitator," all of which are hereby incorporated by reference herein in their entirety.

TECHNICAL FIELD

The present invention relates to the field of payment systems and more specifically to the field of multi-function payment devices.

BACKGROUND

There are at least three payment types that are currently in common use. They are categorized temporally by when a user pays and when a user makes a purchase. The first payment type, cash or debit, allows a user to pay now and purchase now (i.e., a user pays when they purchase an item). A second payment type, prepaid, allows a user to pay now and buy later (i.e., a user funds an account, and later uses that account to make a purchase). The funds for the account may be provided from any number of different sources. A third payment type, credit, allows a user to pay later and buy now. In that situation, a user basically borrows money to make a purchase.

Currently, when a user desires to purchase an item using a particular account they must have the appropriate payment device on them. The desire to use a particular account can depend on the different and valuable rewards a user may receive for using one account as opposed to another account. The user often finds herself carrying a large number of payment devices when she goes shopping, with each payment device associated with a different reward program.

Digital wallets have been developed that allow a user to more conveniently use and manage multiple payment devices. However, these digital wallets do not remove the need to separately sign up and maintain various accounts. Further, the payment devices are not associated with each other in any way, nor does the wallet create associations between the payment devices. Digital wallets simply offer a better way of managing existing payment devices.

Multifunction cards currently exist that allow a user to have multiple functions on a single payment device. These types of payment devices are also called multitender when they combine different payment types. However, these cards suffer from some of the same disadvantages as single function cards. If a user desires one function that is installed on a multifunction card, such as a credit function, they also need to accept all the other installed functions on the multifunction card. This "package deal" type of offer from an issuer can result in a user paying unnecessary fees for the additional functions they don't use, and can even result in a user carrying a large number of payment devices. Meanwhile, the user ends up using just one function from the multiple functions on the payment device.

Both digital wallets and multifunction cards also suffer from the problem that a user may sometimes purchase an item using one payment device, such as a debit card, but have insufficient funds to complete the transaction. This results in a merchant having to take steps to either get sufficient payment from the user, or retrieve the item that was purchased (if possible), otherwise the merchant will take a loss on the transaction. A user may also be charged substantial fees by a bank for having insufficient funds in an account to complete a transaction.

For example, a user may attempt to pay for a coffee using a multifunction card that has both a credit function and a prepaid function. The user may choose the credit function to purchase the coffee, but have the transaction denied because of an insufficient credit limit, even though the prepaid function had sufficient funds to purchase the coffee.

This denial of the transaction and assessment of a fee to the user can be both embarrassing and aggravating. These feelings may even be enhanced when a user has a digital wallet or multifunction card associated with other functions that could have completed the transaction.

Related to the above problem of separate functions in a digital wallet or multifunction card is the corresponding separate reward program associated with each function. Reward programs reward a customer for certain types of behavior. Rewards may be provided to a user for making payments/purchases of a certain amount or type, for performing certain activities, for purchasing from particular businesses, or simply for maintaining accounts. One way reward programs build loyalty is by rewarding a customer based on the value of their payments. Another way is to reward customers for purchasing specific items.

Although the reward earned from various reward programs can be valuable, it can be difficult to accumulate sufficient reward value to receive a meaningful reward from the program. This is especially true when each payment device is associated with a separate reward program with a different structure and set of rules. For example, a user may use a credit card for travel purchases, but a debit account for purchases at a grocery store. Although each may reward the user with points that can be redeemed for more travel and more groceries, respectively, the points cannot be combined.

When a user utilizes a payment device at the point of sale, the merchant is charged a fee depending on a number of factors, which may include, the amount of the transaction, a fixed transaction fee, and/or volume discounts. For example, a merchant may be charged $2 per transaction, for a $100 purchase by the user. These fees are set by the provider of the function, and may differ between providers. For example, one provider may have a lower fee for processing credit transactions than another provider. In multifunction cards, the fee charged to the merchant also depends on the type of function being used. Therefore, there is a disincentive to an issuer of multifunction cards to combine functions that charge a low fee, with functions that charge a high fee. The user (with or without merchant incentives) may choose to utilize the low fee function to the detriment of the function provider.

SUMMARY

Embodiments of the present invention allow a user to associate a user operation vehicle (e.g., a card-type payment device) with an offered set of payment functions. Payment types that may be selected for association with the user operation vehicle include, a credit function, a debit function, a prepaid function, and/or a reward function. The prepaid function can be a proprietary stored value system that allows the payment types to be used at multiple retailers in the same way as a debit card, but without the need for a bank. By allowing a user to, e.g., select multiple functions/payment types for association with the user operation vehicle, the given function can be used at those retailers participating in the payment system associated with that function, while other functions/payment types can be used at non-participating retailers. After the user's selections are received, the user's eligibility for the payment types is verified (i.e. a credit check), after which the payment types are associated with the user operation vehicle. A user may then utilize the payment type to make payments (or purchases). A reward feature can be used in conjunction with any of the other payment types (or by itself in conjunction with, e.g., a cash payment), and this allows transaction information to be easily associated with a particular user.

Embodiments of the present invention also allow multiple payment types on a user operation vehicle (and between user operation vehicles) to interoperate. During utilization of a user operation vehicle, depending on a set of default and/or user entered rules, one or more payment types associated with the user operation vehicle can provide funds to one or more other payment types associated with the user operation vehicle. This transferability of funds between payment types can act as a form of "over-limit" protection for the user. Alternatively, funds from one or more payment types can be provided to a merchant or other party involved in a transaction.

Thus, in a first embodiment of the invention, a user through a user station can select from a set of offered functions which ones she would like to associate (link) with a user operation vehicle. The user's selections are verified by a verifier responsive to the user station or input medium. The verifier determines, based upon a set of pre-determined rules, whether the user is authorized (entitled) to the selected functions. A linkage generator then associates the user operation vehicle with the selected functions once the selected functions have been verified by the verifier. The available functions for the user operation vehicle include a debit function, and at least one of a credit and prepaid function. Other functions that may be included are a prepaid function and a reward function. All of these functions may be associated with a single pre-defined personal account designation. The pre-determined rules, the verifier, and the linkage generator may be operated by a single entity, or separately by multiple entities.

The user operation vehicle may be utilized by a user at a point of sale by selecting the desired function. Transaction information is forwarded to and processed by a financial processing entity, for example, for use in a self-executing marketing campaign. In one possible embodiment of the invention, the user operation vehicle is a smart card, and the transaction information may be either partially, or completely, processed locally. Additionally, in combination with the use of any of the functions associated with the user operation vehicle, a user can also select to use a reward function. Alternatively, the reward function can be automatically selected for use. Before utilizing the user operation vehicle, the user may be required to provide additional information, such as a PIN. The PIN can be used for verification and/or transaction processing purposes. For example, the PIN may be used to indicate which function a user wishes to utilize at a point of sale.

In a second embodiment of the invention, the functions linked to the user operation vehicle are interoperable. Funds and/or rewards from a first function can be provided to a second function in response to utilizing the second function of the user operation vehicle. Funds and/or rewards from a first function can also be provided to a merchant or other party involved in a transaction. Additionally, depending on the interoperability rules, funds and/or rewards from the second function can be used to provide, or facilitate providing funds to the first function in response to utilizing the first function of the user operation vehicle. Interoperability may take place any time a second function is used, including when the second function has insufficient funds. Before interoperability has occurred a user may be asked to confirm the providing of funds. Additionally, after funds have been provided, a user may be informed of the results of the interoperability process.

Interoperability is performed according to a pre-determined set of rules which may be either default rules, or rules entered by a user. In one embodiment, the rules may define a hierarchical ordering among the plurality of functions associated with the user operation vehicle. In another embodiment, a user may choose among offered sets of rules. A rule engine residing with a centralized computer server can be used to execute these rules. The rules may also be based on one or more features of the transaction, such as the amount of funds in a first function. Interoperability may be enabled or disabled for any transaction as desired by a user. In a third embodiment of the invention, functions associated with multiple user operation vehicles can interoperate in a similar manner as to functions associated with a single user operation vehicle.

Any of the above embodiments may be realized as a computer program product executed on a computer. The computer program product may be stored on a physical medium, or embedded within a carrier wave.

It is also contemplated that some or all aspects of the first and second embodiments mentioned above (and described in greater detail below) can be combined. While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIG. 3B is a continuation of the flow diagram of FIG. 3A.

DETAILED DESCRIPTION

Throughout this application the term "user operation vehicle" is used to refer to any device, biometric identifier, or method for conveying information that may be used to conduct a transaction. Example user operation vehicles are plastic cards with a magnetic strip, a smart card storing information in onboard memory, a card containing only an identifier and linked with a remote database, a fingerprint, a retina pattern, a voice pattern, or any other physical feature that is distinguishable between individuals. A user operation vehicle could also be any other information, such as a memorized code without a corresponding card or device to store or transfer that code.

Figure 1:
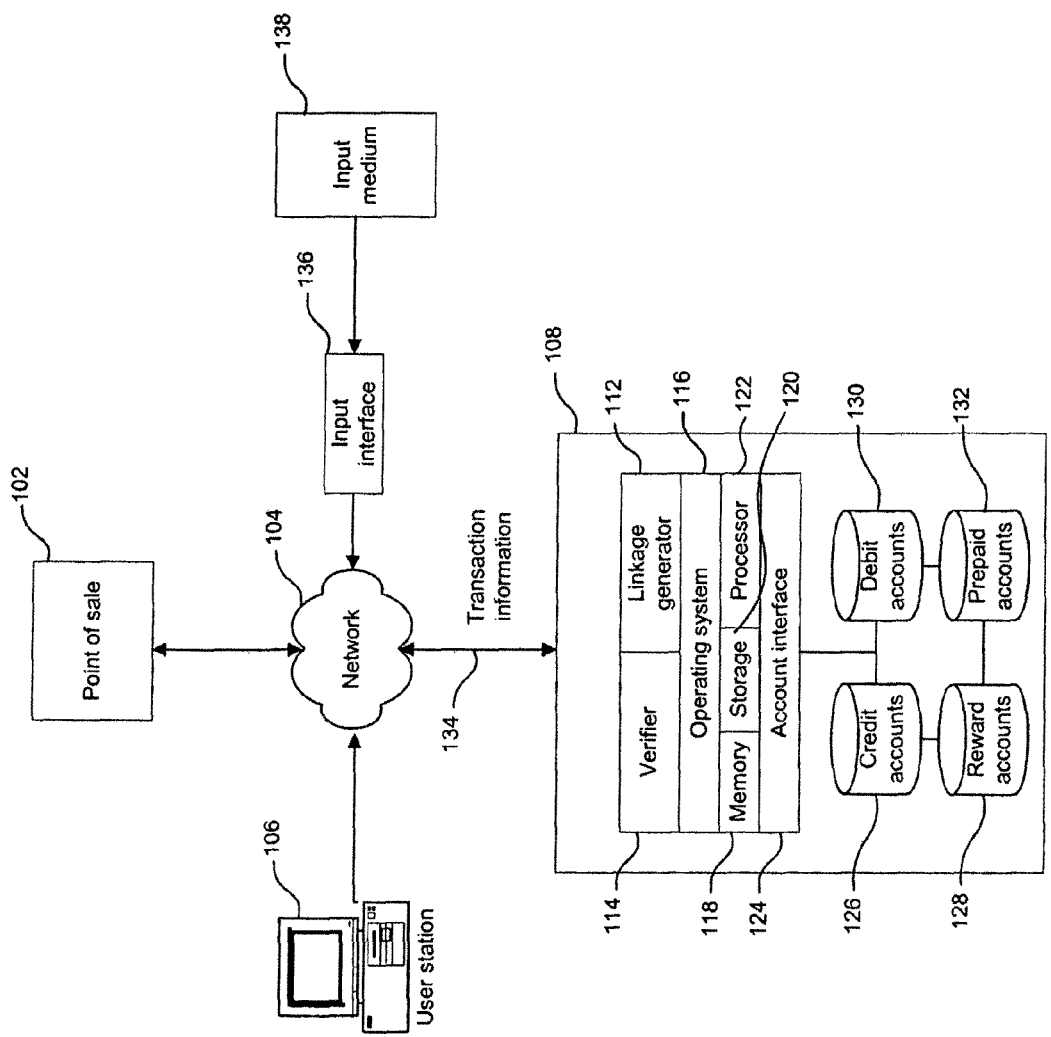
FIG. 1 is an overall example block diagram in accordance with embodiments of the present invention.

FIG. 1 shows an overall block diagram of a payment system in accordance with embodiments of the present invention. Point of sale 102 is used to conduct transactions with a user operation vehicle (not shown), and serves to connect the user operation vehicle with a financial processing entity 108. Point of sale 102 may be any device that can be used to conduct transactions with a user operation vehicle, such as a stand alone cash register, a telephone, an Internet connected computer, or a catalog and purchase form. Point of sale 102 may also be connected to barcode scanners, radio frequency identification scanners, and other sensors for recording transaction information, such as product identifiers.

User station 106 and/or input medium 138 (in conjunction with input interface 136) may be used by a user to select functions to be associated with a user operation vehicle, and may be any device or entity capable of communicating a user's selections to the entity responsible for processing the selections. For example, the user station 106 may be a touchscreen or a keypad. User station 106 may also be a networked computer or a telephone. Input medium 138 may be, e.g., a mail-in form or a form presented at a point of sale, and input interface 136 can be any entity for facilitating entry of information to financial processing entity 108.

Financial processing entity 108 is connected to user station 106 and point of sale 102 through network 104. Financial processing entity 108 (or portions thereof) may be involved in processing both selections from user station 106 (and/or input medium 138) and transaction information generated at point of sale 102 from utilization of a user operation vehicle. This processing may include completely or partially processing the transaction information including verifying the correctness of the transaction information, performing settlement, and providing confirmation of the transaction. Alternatively, financial processing entity 108 may only manage or control the overall transaction (as opposed to processing). For example, financial processing entity 108 may communicate with a third party to perform settlement of debit transactions. For information relating to user station 106 and/or input medium 138, financial processing entity 108 may, for example, manage communications with a third party database to confirm account information is valid before linking it to a debit function of a new user operation vehicle. Financial processing entity may also manage communication among subcomponents such as verifier 114 and linkage generator 112.

Transaction information 134 can be any information needed for conducting a transaction with financial processing entity 108. This may relate to, e.g., initially associating functions with a user operation vehicle, or purchase transactions relating to utilizing a user operation vehicle.

Verifier 114 verifies that users are entitled (or authorized to have) the functions initially offered to them that they have selected for their user operation vehicle. The operations performed by the verifier may vary depending on the selections by the user.

Linkage generator 112 links a user's selected functions with a user operation vehicle. This can include creating or updating a user account containing information about the user operation vehicle and the selected functions. Information about the user operation vehicle may be collected and stored by linkage generator 1 12, to later be accessed when user operation vehicle is utilized. The type of information collected by linkage generator 112 (and the way it is collected) may depend on the type of user operation vehicle. For example, a magnetic card reader could be used to swipe a plastic card with a magnetic strip and collect the necessary information for the linkage generator 1 12. As another example, a fingerprint reader may be used to record a user's fingerprint that serves as the user operation vehicle. Potentially selectable functions contemplated by embodiments of the present invention include, for example, those relating to debit, credit, prepaid and reward operations.

Verifier 114 and linkage generator 112 can operate on an operating system 116 that manages other aspects of the transaction processing system. The operating system 116 is executed on well known hardware such as memory 118, storage 120, and processor 122. Memory 118 can be any volatile or non-volatile storage that can be used by both the operating system 116 and the applications being executed by the operating system 116. Storage 120 is any conventional non-volatile storage for storing applications, software, and other system data. Processor 122 is a conventionally known microprocessor or similar device capable of executing software. Alternatively, verifier 114 and linkage generator 112 can be computer program products that are stored on a physical medium such as a hard disk, CD or flash drive. The computer program product may also be embedded in a carrier wave.

Account interface 124 provides an interface between the higher level components of the financial processing entity 108, such as the verifier 114 and linkage generator 112, and the underlying data repositories of credit accounts 126, debit accounts 130, reward accounts 128 and prepaid accounts 132. Each data repository stores account information corresponding to the functions linked with the user operation vehicle. Account interface 124 can perform the standard functions of middleware, such as, data layer abstraction, caching, and resource management. Alternatively, all or part of the account information corresponding to the linked functions may be stored on the user operation vehicle, for example, in the memory of a smart card. The remaining information corresponding to the linked functions may be stored at the data repositories as described above.

The data repositories for each of the types of accounts may be combined into one or more data repositories based on the requirements of the system. The data repositories may be implemented in any manner that allows the storage and retrieval of information. For example, a relational database may be used with a single table for each type of account, or alternatively, a single table with additional columns of information pertaining to each type of account.

Although the verifier 114 and linkage generator 112, as well as data repositories 126, 128, 130, and 132 have been shown contained within financial processing entity 108, the present invention envisions any number of alternative configurations. In one situation, verifier 114 and linkage generator 112 may be executed by a separate third-party entity. For example, when a user selects a credit function for association with a user operation vehicle, verifier 114 may be a third-party credit bureau performing a credit check, and through network 104, the third-party credit bureau can communicate with financial processing entity 108 and linkage generator 112 to link the user selected function to the user operation vehicle. Further, the financial processing entity 108 may store some accounts (for example, reward and prepaid accounts) and may communicate with another entity that maintains credit accounts. That same entity may also perform verifying and linking operations when a user selects a credit function. Regarding transaction processing, the financial processing entity 108 may completely process a transaction, for example, a prepaid function transaction, especially if that account data is stored at the financial processing entity. However, the financial processing entity 108 may also just supervise a transaction as different parts of it are processed by different entities.

Figure 2:
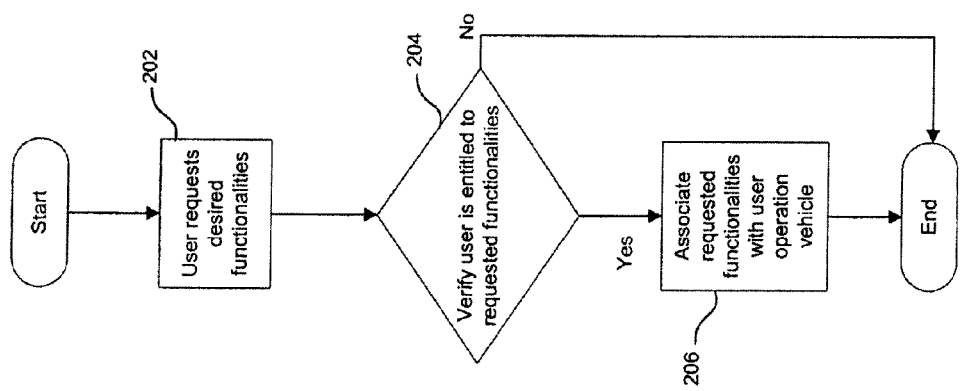
FIG. 2 is an overall example block flow diagram in accordance with embodiments of the present invention.

FIG. 2 is a flow diagram of a process for associating a single function with a user operation vehicle. The process may be repeated where multiple functions are to be associated with a user operation vehicle.

Referring to FIG. 2, at step 202, a user selects a function, from the offered set of functions, to be associated with a user operation vehicle using, e.g., user station 106.

At step 204, the functions selected by a user are verified by verifier 114. If a user is entitled, or authorized to have the selected functions, then at step 206 the requested functions are linked with a user operation vehicle using linkage generator 112. Otherwise, if a user is not entitled to the functions and the method ends. A user may be notified of the rejection and any associated information after processing of the selected function has been completed. Processing of the next function selected by a user begins again with step 202.

Figure 3A:
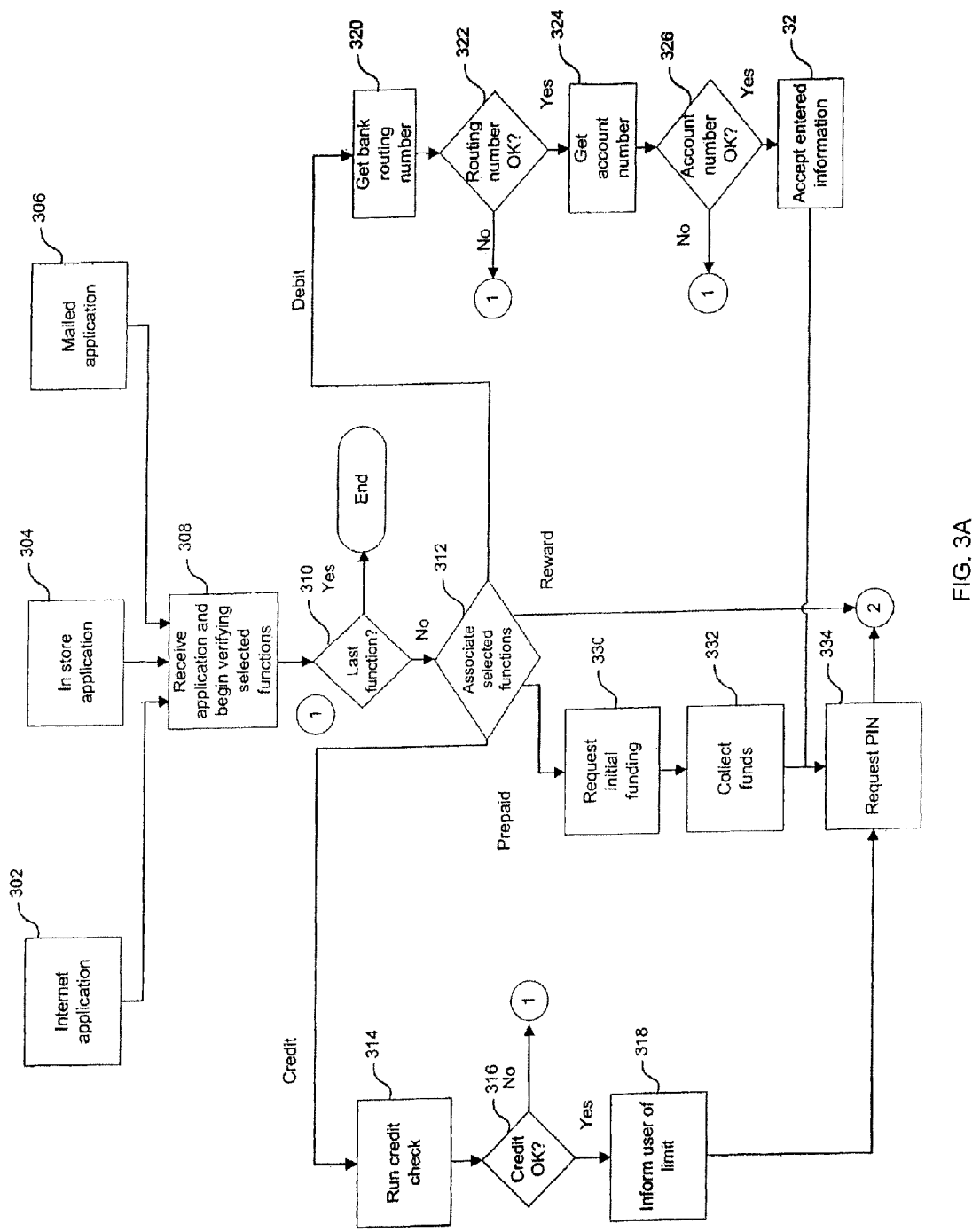
FIG. 3A is an example flow diagram for implementing functions for use with a user operation vehicle in accordance with embodiments of the present invention.

FIGS. 3A and 3B are flow diagrams showing more example details of the process of FIG. 2, in accordance with embodiments of the present invention. A user may submit their selected functions for association with the user operation vehicle from any number of sources. For example, referring to FIG. 3A, selections may be received from any one of an Internet application 302, an in-store application 304, or a mailed application 306. These are only examples, and any other method (using any number of devices or mediums) may be used that allows a user to communicate their requests to the entity responsible for associating the appropriate functionality with the user operation vehicle.

In addition to selecting functions, a user may also submit related user operation vehicles (i.e. a spouse's) to associate with the user operation vehicle being applied for. This allows not only functions associated with one user operation vehicle to interoperate, but functions from different, but related, user operation vehicles to interoperate.

The selections received by Internet application 302 can be submitted through any standard networked computer using a web application, a Java application, or downloadable software. Further, the process of selecting functions may be combined with another process, such as ordering items from a retailer.

In-store application 304 may be completed at the point of sale, for example, when a user is making a purchase. Alternatively, an in-store application may be completed beforehand and brought to the proper agent within the store to complete the application process. Mailed application 306 may be similar to in-store application, except that the mailed application is mailed in for processing instead of being presented in person.

Applications may also be completed by telephone (not shown). A user can call a customer service representative, and through the customer service representative can make their selections. Similarly, selections may be made through an automated voice response system.

The user's requests for functions from any of the previously described sources are received at step 308, and the process of verifying the requests begins. The requests are verified according to a set of pre-determined rules. These rules may depend on the function selected by the user. For example, to be verified for a credit function, one rule may specify that a valid address must be provided, so that the issuer of the user operation vehicle can mail billing statements to the user. Similarly, for a debit function, one rule may require a valid checking account number.

The verifier and linkage generator may be operated by a single entity. However, each component may also be operated by a different and distinct entity. For example, one function may be a credit function offered by a bank, while another function may be a stored value function, offered by the owner of a proprietary stored value system.

At step 310, it is determined if the last function has been processed. If so, the method ends. Otherwise, at step 312, the process for associating the requested function with the user operation vehicle begins with verifying a user's eligibility for each of the selected functions.

Verifying a request for a credit function begins by running a credit check at step 314. The credit check may be done using any standard method, including using a third-party credit reporting company. A user's past credit history may be checked, as well as the presence of any outstanding debts.

At step 316, if the credit check is not successful, then processing for that function ends, and at step 310, it is determined if there are any other functions to be processed. If the credit check is successful, then at step 318 a user is informed of their credit limit and a personal identification number (PIN) is requested at step 334. Alternatively, a user may be informed of their credit limit at the end of the activation process. Multiple credit functions may be associated with a single user operation vehicle. For example, one credit account may have a $2000 limit and a 7% interest rate, while another may have a $5000 limit and a 9% interest rate. This example would allow a user to easily tailor their payment function to their financial situation.

For any of the functions requested by a user, the use of a PIN is a feature contemplated by at least some embodiments of the present invention. Further, any information that verifies the user of the user operation vehicle may be used in place of a PIN, including a password, a response to a secret question, or a biometric identifier. A PIN is only one example of a widely used method of verifying a user's identify. A PIN can also be used to assist processing of a transaction.

Verifying a request for a debit function begins at step 320. A bank routing number is requested for the bank where the bank account is located. At step 322 the bank routing number is verified using a data repository of known routing numbers. At step 324, an account number at the bank associated with the bank account is requested. At step 326, the account number is verified using a data repository containing information about the different formats and account numbers used at banks. The verification can be done by the financial processing entity, or through a third party provider such as Certegy Inc. or the Thomson Corporation. The bank routing number and the account number are a unique combination that allows the identification of a particular bank account. This information is then accepted at step 328, confirming that a valid bank account has been entered by the user. A PIN is requested at step 334 in the same manner as for a credit function. A single user operation vehicle may be associated with multiple debit functions, each associated with a respective bank account. This would conveniently allow a user to have a debit function, e.g., for "paying bills" while another debit function may be for "entertainment" expenses.

Verifying a user selection for a prepaid function begins at step 330, where initial funding for the prepaid function is requested. Initial funding may be provided by any standard payment method such as credit, debit, cash or another prepaid function. At step 332, the funds are collected and a PIN is requested at step 334. Depending on the requirements for the prepaid account, no funds may be required to create an account, and steps 330 and 332 may thus be bypassed. Similar to credit and debit, a single user operation vehicle may have multiple prepaid accounts, each with a distinct balance. Multiple accounts may be useful for a parent who has provided a user operation vehicle to a child, along with the corresponding PIN. The parent may allow the child to utilize the user operation vehicle without worrying that an excessive amount of expenses will occur.

For a reward function, no verification may be required, and processing begins directly at step 350 (FIG. 3B) where an interoperability feature may be implemented. A reward function allows a user to receive benefits for performing certain activities. These activities may be utilizing a user operation vehicle, maintaining an account, or purchasing specific items. Such rewards may be in the form of immediate credits to a transaction, future discounts, or credits to a periodic bill. Reward programs create customer loyalty by creating an incentive for customers to purchase specific items or shop at a specific business repeatedly. As a customer continues to make purchases, for example, at a particular retailer, a reward account balance increases. Eventually, the reward account balance may be used to purchase items, receive discounts, or be converted into cash.

A reward function can be used in conjunction with any other function of the user operation vehicle. A user operation vehicle may have more than one reward account corresponding to different activities or value. For example, one account may accrue a benefit equal to 5% of all purchases to be used as future discounts, while another account may accrue benefits of $1 for every one of a particular item that is purchased.

After verification of the selected functions is performed as described in FIG. 3A, a determination is made at step 350 if the user has also requested interoperability to be activated in conjunction with any of the functions that have been selected. If interoperability has been requested, then at step 352 the feature is activated with default interoperability rules. The user may also enter their own rules using the user station (or input medium 138 and input interface 136) at step 354. The user rules may override default rules, be in addition to the default rules, or may be overridden by the default rules, depending on the desired behavior of the system. The rules may describe bidirectional interoperability between two functions. A first function can provide funds to a second function when the second function has insufficient funds, and the second function can provide funds to the first function when the first function has insufficient funds. Each function provides coverage for the other function. One function may also provide coverage for a number of other functions.

The rules for interoperability, in at least some embodiments of the present invention, depend on the transaction features determined to be important for applicability of interoperability. For example, if the important transaction features are the function utilized and the amount of the transaction, then the rules could define a hierarchy of functions to be used to fund the transaction. Specifically, assume that a user tries to purchase a $100 widget using a debit function, but has only $80 in their account. Further assume the hierarchy of functions specified by the rules is credit, debit, prepaid, and credit2 (a second credit function). In that case, interoperability would be needed to complete the transaction, and the credit function would be charged $20 (or $100, depending on the design of the rules). However, if the credit function had insufficient funds, the debit function would be skipped (already applied) and the prepaid account balance would be reduced by $20. Alternatively, if the credit function had $10 of limit remaining, it could be charged $10, and the prepaid could be charged $10. As another alternative, the functions could be applied in the order of those with the largest balance (non-hierarchically applied). As can be appreciated by those skilled in the art, any number of combinations of amounts and functions can be accommodated by the present invention.

As another example, if the transaction features of interest are the function utilized and credit function interest rates, then in response to insufficient funds when utilizing a prepaid function, the credit function with the lowest interest rate could be charged. Assuming a first credit function has a variable % 7 rate, and a second function has a variable % 4 rate, and a third credit function has a variable % 15 rate, the payment system could automatically choose the credit function that currently had the lowest interest rate, without a user having to make any decision.

A user may be presented with a set of default rules to choose from, or may enter their own depending on the options provided by the financial processing entity 108. Alternatively, predefined sets of rules may be supplied for a user to choose from, such as group rules relating to a group to which a user belongs, or a specialized parent/child rule set that bases interoperability on the identity of a user.

After the process of verifying the selected functions and activating interoperability, the linking process, done by linkage generator 112, begins at step 336. An account is created for each of the functions that was verified in the process described above, including information about the interoperability rules applicable to that function. Alternatively, one account may be created having multiple functions. Each account may be assigned an account number or other identifier for management purposes. The newly created accounts are then associated with the user operation vehicle at step 338. This involves configuring the accounts or other systems so that the accounts are capable of processing transactions using any of the user's selected functions. This may be done for separate functions at separate times depending on the implementation of the system and the results of the verification process.

The customer is notified of the results of the verification and linking processes at step 340. This notification may include the results of the verification process, such as which functions were verified, and which were not. A corresponding explanation of the reasons for acceptance or denial of a function may also be included, if desired, or if such an explanation is required by legal regulations. The notification may also include a disclosure of fees, and other details of the created accounts such as, credit limits, usage limits, reward benefits, interest rates, and interoperability rules. This step also allows any errors to be immediately brought to the attention of the user.

There are any number of ways that the present invention contemplates notifying the user of the results, some of which are now described. At step 342, the notification information is provided to the user directly through the Internet. At step 344, the user operation vehicle is provided through the mail to the user, if applicable. It may be unnecessary to deliver some user operation vehicles, for example, those user operation vehicles that are biometric identifiers. Alternatively, the user operation vehicles may be delivered by other services than mail, or be prepared for a user to pick them up from a certain location. Finally, the user operation vehicle may also be delivered electronically. For example, if the user station is a networked computer, then the user operation vehicle may be immediately printed on a printer attached to the computer. Electronic delivery may also be completed by sending programming signals to an existing device, such as a smart card attached to a user station.

At step 346, both notification information and the user operation vehicle may be provided to the user immediately. Information could be printed from the user station, which could also dispense a user operation vehicle. Alternatively, to speed up the activation process, information and a user operation vehicle may be mailed to a user at a later time. As described above, it may be unnecessary to provide a user operation vehicle in the case of a biometric identifier, or if a user already has a device they would like to associate the functions with.

The process of notifying the customer through the mail at step 348 is similar to the process used for the in-store and Internet applications. The information and user operation vehicle can be sent through the mail, or made available for pickup. Additionally, electronic methods may be used to deliver the user operation vehicle.

After a user operation vehicle has been linked with a user's selected functions, a user may use those functions at a point of sale to conduct transactions. A point of sale may be any device or procedure used to conduct transactions, for example, a cash register, an Internet connected computer, a telephone and automated voice system, or a purchase form and a catalog.

Referring to the example details of FIGS. 4A-D (and first to FIG. 4A), at step 402, the user operation vehicle is utilized at a point of sale. At step 404, the process is started for executing a transaction with the utilized function.

If a user requests to use a reward function with the transaction, then, at step 406, information about the reward account is collected, such as the reward account identifier. The reward account identifier is used to access the reward account information in database 128, and may be used to identify the user of the function, even if they are paying with cash. The database can be used to store information, such as the reward account balance accumulated from purchases.

This reward account identifier is then stored in a database at step 408 for later retrieval during processing of another function. This allows subsequent transaction processing to know that a reward function has been activated for the transaction. The database storing the reward account information, such as the reward account balance, may be stored locally or remotely, and may be used to store information from multiple point of sale devices. Local storage may be at the point of sale 102, while remote storage may be at financial processing entity 108. Similarly, reward values may be calculated at a point of sale and sent to financial processing entity 108 along with other transaction information, or may be calculated by financial processing entity 108 once all transaction information is received. Once the reward account identifier has been stored, the reward feature for the transaction is activated at step 410.

Alternatively, the above process may occur automatically when any other function of a user operation vehicle is utilized, with the collection of the reward account identifier occurring at the same (or substantially the same) time as the processing of the transaction. For example, at a point of sale that is a networked computer (i.e., a computer connected to the Internet), the user may choose to utilize a credit function to purchase an item, and along with this selection, the user may indicate to apply the reward function to the transaction. This indication may be, e.g., checking a checkbox in a web application. Similarly, if interoperability is not automatically applied to each transaction, another indication from a user may be used to activate or disable interoperability for the transaction.

Referring back to step 404, if either a prepaid, credit or debit function is requested, then at step 412, a determination is made whether, via the mechanisms mentioned above, the reward function has been activated. This may be performing a check with point of sale 102 or financial processing entity 108, and retrieving the reward account information. If a reward function has been activated, then data on the transaction is collected at step 414 and associated with a user by using the reward account identifier. The collected data may include the items being purchased, any discounts or other coupons applied by the user, the identity of the user, and/or the time and location of purchase. The collected information may be sent along (or included in) with transaction information to financial processing entity 108 for storage in a database of other transaction information (i.e. a data warehouse). Alternatively, the collected information may be used in a locally installed system, such as one for printing coupons.

A reward function may also be used in conjunction with a cash payment. Transaction information may still be sent to financial processing entity 108 or another third party entity for processing. As before, transaction information may be stored and later analyzed for marketing, logistics, or other business purposes.

For transactions where a reward function has not been activated, transaction information may still be collected using information collected from user operation vehicle when it is utilized. For example, a credit function account number could be used to properly associate transaction information with previous transactions by the same user. However, for a cash payment, although transaction information may be collected in the same manner as for other payment types, it may be more difficult to associate the transaction information with a particular user. Additional information may be requested from the user to properly associate the transaction information with them, such as a phone number.

At step 416, the amount of the transaction, or other features of the transaction, are determined for the purpose of, e.g., applying interoperability between the multiple functions linked to the same user operation vehicle. In addition, interoperability may be applied between functions on separate, but related, user operation vehicles. These related user operation vehicles can be those the user selected when applying for their own user operation vehicle. This information on related user operation vehicles can be stored along with other account information relating to the functions linked to the user operation vehicle.

At step 418, if a debit function has been selected, then in various embodiments, interoperability may be not be applied before the batch settlement process. This is because use of batch processing can prevent the amount of funds in the user's account from being immediately ascertainable. The use of batch settlement with debit transactions limits the rules that can be applied to determine if interoperability should be applied. However, if the funds in a debit account can be determined (or in some way estimated or predicted) during the course of the transaction, similar to credit, then interoperability may be more readily applied where the debit function has been selected, as discussed in greater detail with regard to FIG. 5.

At step 420, it is determined if interoperability has been activated. Activation may be done automatically based on step 350. Alternatively, at step 402, a user may activate interoperability for a particular transaction at the point of sale.

The interoperability process may then be applied at step 422. Interoperability may be applied early in the transaction processing, depending on the features of the transaction that are used for applying interoperability. The process of applying interoperability checks either the default or user rules regarding when interoperability should be applied. Depending on the interoperability rules selected by a user at step 354, and/or the default rules, application of the interoperability process may not result in the transfer of any funds between any accounts. The interoperability process may simply determine that no interoperability processing should be done. If the rules indicate that interoperability is to be applied, then after application of the interoperability rules, a second function may be chosen based on the rule processing. This second function is then processed in a similar manner to the first function, except it is used to provide funds to the first function instead of completing a "second function" transaction. Alternatively, the transaction can be completed using the second function, and the first function or transaction is cancelled. The second function is, generally, processed at steps 404 through 464 in a similar manner as the first function. A reward function can be activated for processing of the second function, and transaction information can also be collected. This process is further described with reference to FIG. 6.

The interoperability rules can be executed by any business rule server or business rule engine (not shown). The rules can control the interoperability between functions of a user operation vehicle. The interoperability rules are executed in order to transfer funds between functions, or to complete a transaction using a different function than the one that was used to start the transaction. For example, the interoperability rules can be executed so that a debit function can provide funds to another function, or so that it can receive funds from another function. As another example, as part of the interoperability process, a debit function can provide funds to a merchant or other party to a transaction, instead of providing funds to another function as in the example above.

A primary account may be maintained by business rule server, or accessible from the business rule server. The primary account can have information relating to all the other functions associated with the account, such as, information about the user of the account, and the interoperability rules. The primary account may also be associated with one more subaccounts corresponding to the various functions. These various functions may, or may not, be stored at the issuer of the user operation vehicle. When a user operation vehicle is utilized, the interoperability rules associated with the primary account can be accessed and executed. Execution may involve communicating with an ACH processor to process a debit transaction providing funds to a credit function, or communicating with a provider of a prepaid function to transfer funds to a debit function.

The business rule server (or business rule engine) described above can be a computer executing an operating system and other application software. It may be associated with the same entity that issues the card (which could, for example, be financial processing entity 108), however this is not necessary. The business rule server can be used to process both the default and user interoperability rules associated with a user operation vehicle. After a user operation vehicle is utilized at a point of sale, the transaction information can be routed to a business rule server for further processing. Routing may be done using an account number associated with the user operation vehicle, for example, by using the first few digits of the account number to specify the processor that is to process the transaction. Each processor may have a distinct set of digits to simplify routing of transaction information. Transaction information may be transmitted over the same merchant authorization network that is used for regular payment devices like credit cards. After the transaction has been completely processed, a positive or negative authorization may be sent back to the point of sale using the same network as before.

Once the transaction information is received by the business rule server, the server can use the account number or other identifier of the user operation vehicle to access the corresponding user rules stored with the primary account. As the rules are being processed, the business rule server may communicate with other systems responsible for processing parts of the transaction; the other systems may be operated by distinct entities. For example, a user operation vehicle may have a rule that allows a stored value account for a particular retailer to interoperate with a credit account provided by a bank. The business rule server can coordinate communication between the two systems to ensure that funds are properly transferred in order to complete the transaction.

Figure 4A:
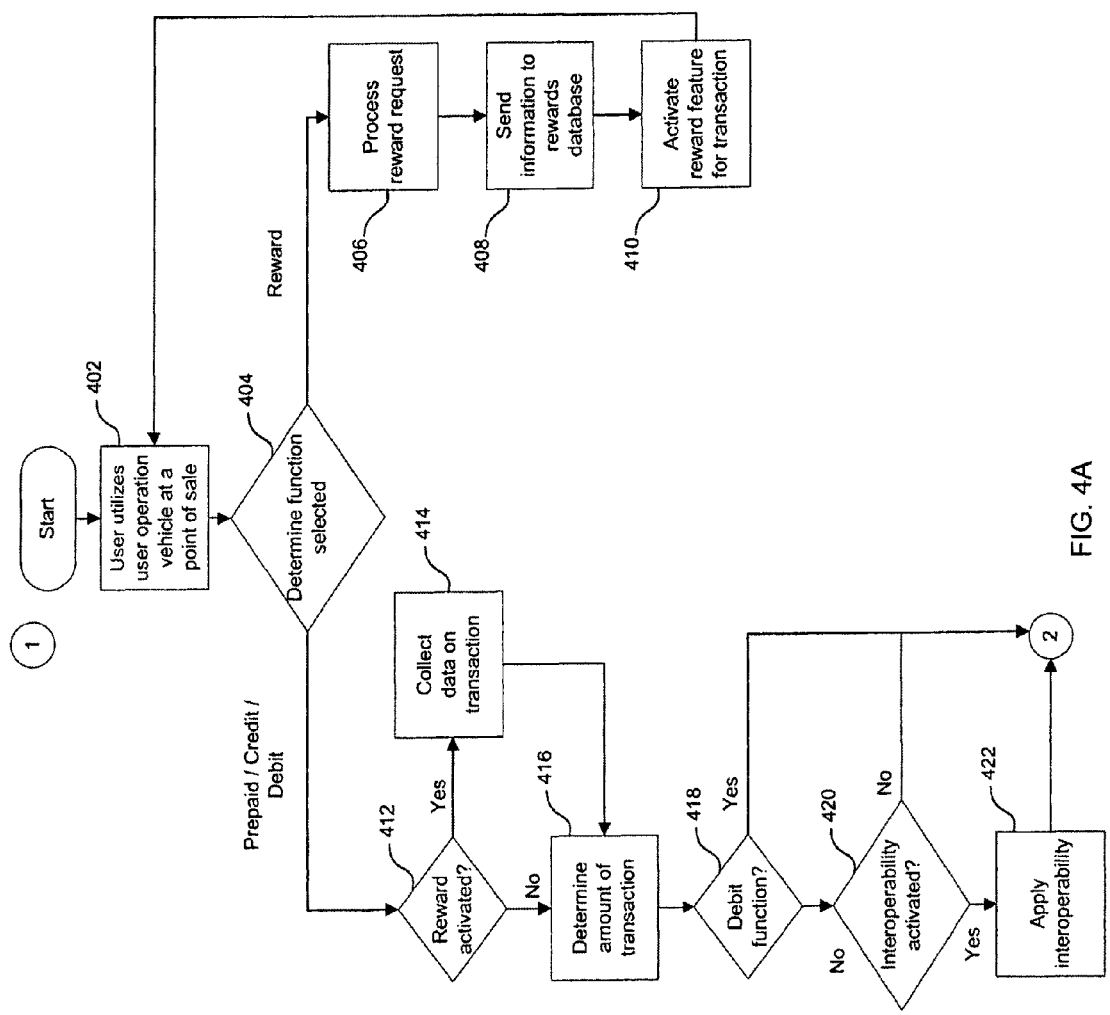
FIG. 4A is an example block flow diagram of a process for utilizing a user operation vehicle in accordance with embodiments of the present invention.
Figure 4B:
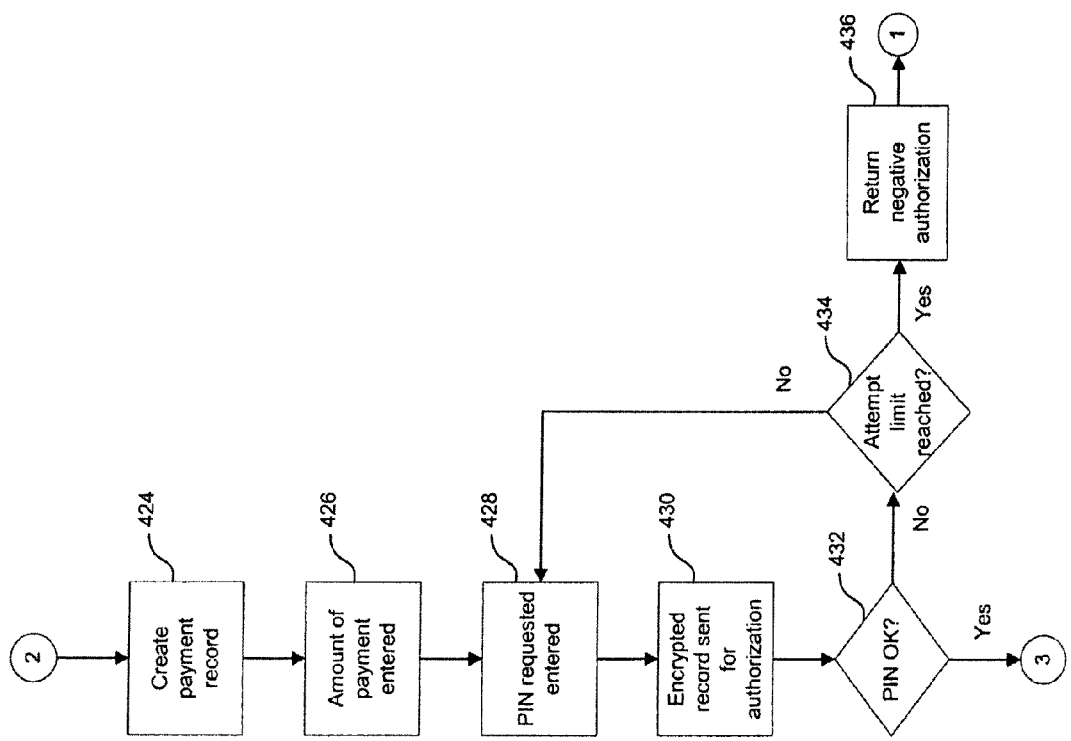
FIG. 4B is a continuation of the flow diagram of FIG. 4A.

Referring now to FIG. 4B, at step 424, a payment record for the transaction is created. The payment record contains information such as the amount of the transaction, the payment function, and features of the transaction. The features of the transaction may be the activation of rewards or interoperability. A payment record is just one way of capturing the transaction flow; electronic data interchange, and other methods may also be used to communicate information between components as a transaction is being processed. At step 426, the amount of payment from the selected function is entered. This amount will typically correspond to the amount of the transaction with offsets for any reward benefits, discounts, coupons or other incentives the user has received in conjunction with the transaction.

At step 428, a PIN is requested and entered by a user. As with many features described in these embodiments, the use of a PIN may be optional or required for the function being utilized. At step 430, an encrypted record containing the PIN is sent for authorization to a financial processing entity 108. Alternatively, a secure communication channel may be used to ensure that the PIN is not discovered. As another alternative, it is not necessary to perform any security in connection with transmission of the PIN, if the level of risk associated with the lack of security is acceptable.

At step 432, it is determined if the PIN entered at step 428 corresponds to the one entered at step 334. For PINs, the PIN entered at step 428 should correspond in some fashion to the one entered during the application process at 334. For those embodiments using other types of identifiers, such as biometric identifiers, there should be sufficient correspondence to verify the identity of the person within a given range of confidence. For the embodiments using PINs, if the PINs are not equal (or otherwise do not sufficiently correspond), then a user may re-enter their PIN at step 428, unless it is determined at step 434 that the attempt limit has been reached. If the attempt limit has been reached, then a negative authorization is returned to the point of sale. A user can then utilize another function (or the same function) to utilize at the point of sale.

Figure 4C:
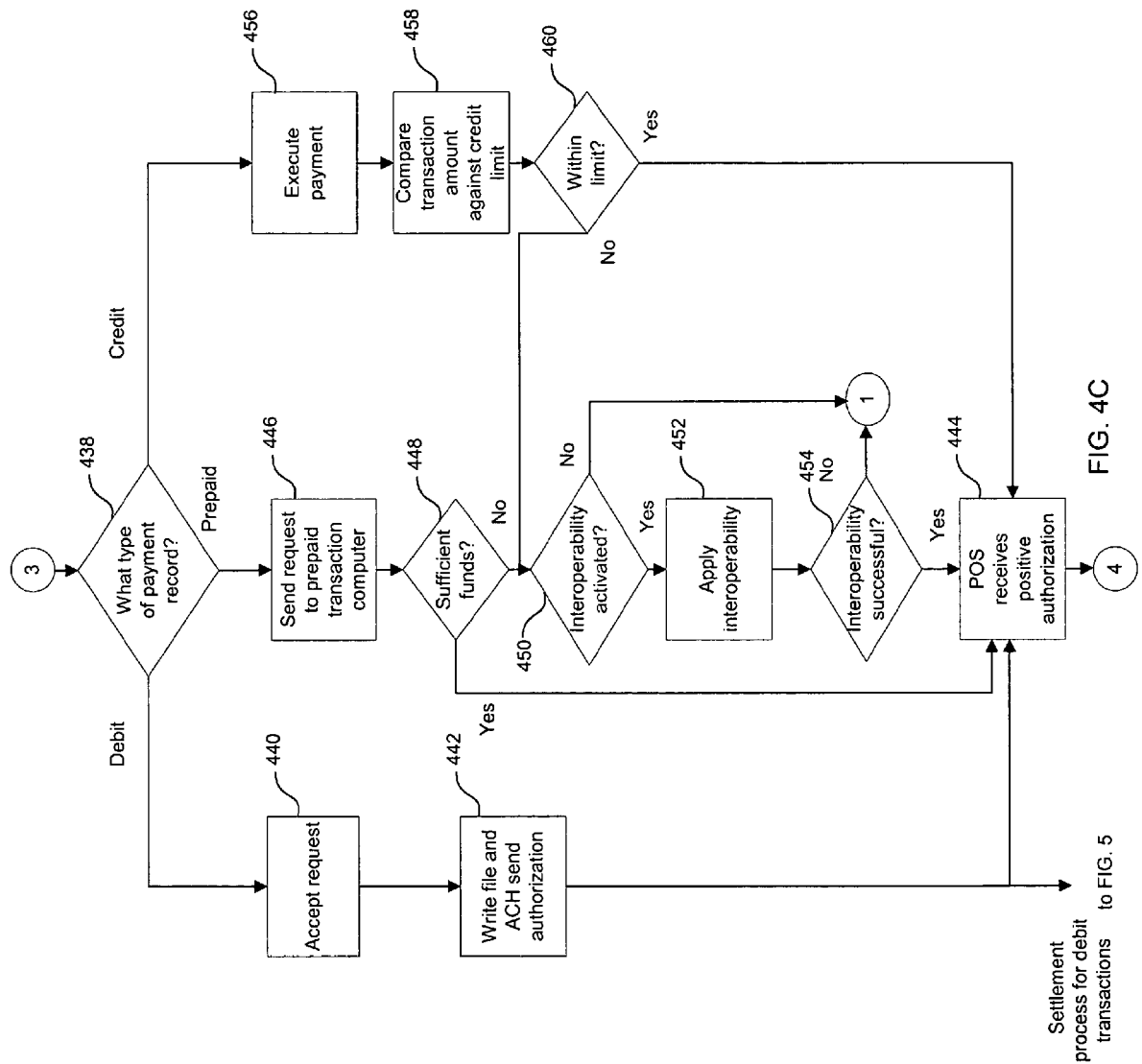
FIG. 4C is a continuation of the flow diagram of FIG. 4B.
Figure 4D:
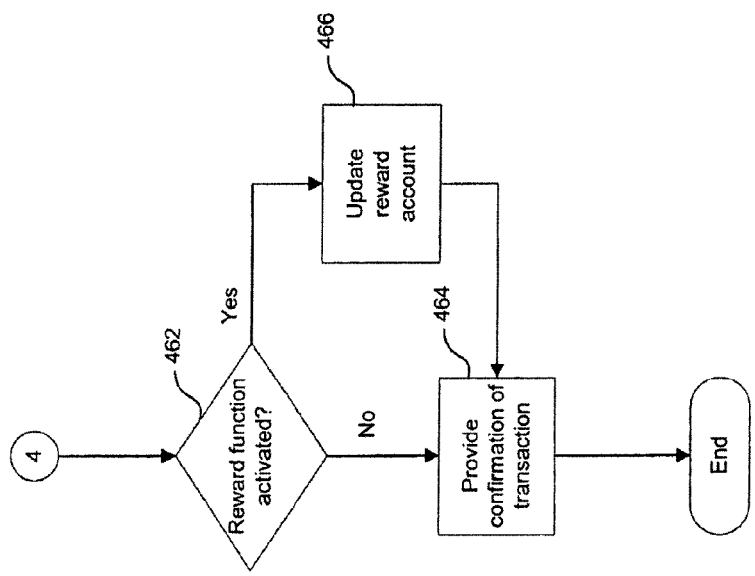
FIG. 4D is a continuation of the flow diagram of FIG. 4C.

After the correct PIN is verified, processing of the payment record begins at step 438 (FIG. 4C). For a debit payment record, at step 440 the payment record is accepted, and a transaction record, as well as an Automated Clearing House (ACH) record is generated at step 442 for later processing in a batch system. The record is created in a format compatible with an ACH network, such as the ACH record format specified by the National Automated Clearing House Association (NACHA). The point of sale receives a positive authorization at step 444. In various embodiments of the invention, debit transactions are analogous to using checks. Thus, the debit request is accepted as sufficient payment, and the determination of whether there are actual funds in an account to satisfy the check is done at a later time.

In at least some embodiments, when information associated with a user operation vehicle is read by a point of sale (i.e. step 402), a user may enter a PIN to both select which of the functions associated with the user operation vehicle they would like to utilize, and for verification purposes. For example, the user may have a separate PIN associated with each function of the user operation vehicle, therefore entering a PIN associated with a specific function would indicate that a user wanted to utilize that function. As another example, a first portion of the PIN may be the same between functions, while a second portion of the PIN may change between functions. A user can then select their desired function by entering the changeable portion that corresponds to the function they wish to utilize.

For a credit payment record, the transaction is executed at step 456. Execution of the function comprises communicating the payment record for processing to the entity associated with the credit account, such as the financial processing entity 108. At step 458, the amount of the transaction is compared against the credit limit for the credit function, and a determination is made at step 460 whether the transaction amount is within the credit limit. These steps may also be done by a third party entity that is managed and controlled by the financial processing entity. If the amount of the transaction is within the limit, the method proceeds to step 444, and the point of sale receives a positive authorization. Otherwise, at step 450 it is determined if interoperability has been activated for this transaction. If interoperability has not been activated, the transaction is cancelled and the user can choose to utilize a different function for the transaction (or the alternate transaction takes place automatically). Information on the transaction can also be provided to a user after cancellation of the transaction.

At step 452, interoperability is applied, and if the application of interoperability is successful, then at step 444 the point of sale receives a positive authorization. Otherwise, the method proceeds back to step 402 and the user can choose a different function to conduct the transaction.

The steps followed for utilization of a prepaid function are similar to those described for a credit function. At step 446, the payment record is sent to a system responsible for processing prepaid function transactions. This may be a financial processing entity 108, or it may be another third party entity. At step 448, it is determined if the prepaid account contains sufficient funds to complete the transaction. If there are sufficient funds, the point of sale receives a positive authorization. If there are not sufficient funds, the steps of 450, 452 and 454 are followed in the same manner as for a credit function.

Alternatively, additional processing for prepaid functions may be performed locally. For example, if the user operation vehicle is a smart card that stores the prepaid balance, then a transaction may be completed at the point of sale without the need for financial processing entity 108. No payment record would be created, and at step 446 instead of sending a payment record to the prepaid transaction computer, the payment amount could be directly deducted from the balance stored on the smart card. Subsequent steps may be performed in the same manner as shown in FIG. 4. Further, transaction information may still be collected and sent to financial processing entity, or collected locally at the point of sale for later processing.

After the point of sale 102 has received a positive authorization, at step 462 it is determined if a reward feature has been activated for this transaction. If a reward feature has been activated, then the corresponding reward account is updated (step 466) with any rewards earned from the transaction. The user may also be informed immediately of the earned rewards on a receipt or other confirmation of the transaction, or the user may be informed on a periodic statement regarding the account. Alternatively, no information may be provided, and a user may monitor the reward account themselves through, for example, a website or in-store kiosk. Finally, confirmation of the transaction may be provided at step 464. Confirmation of the transaction may include information confirming the amount of the transaction after all discounts, the rewards earned, or the balances left in the various functions used to conduct the transaction. Alternatively, confirmation may only signify that the transaction was completed.

Figure 5:
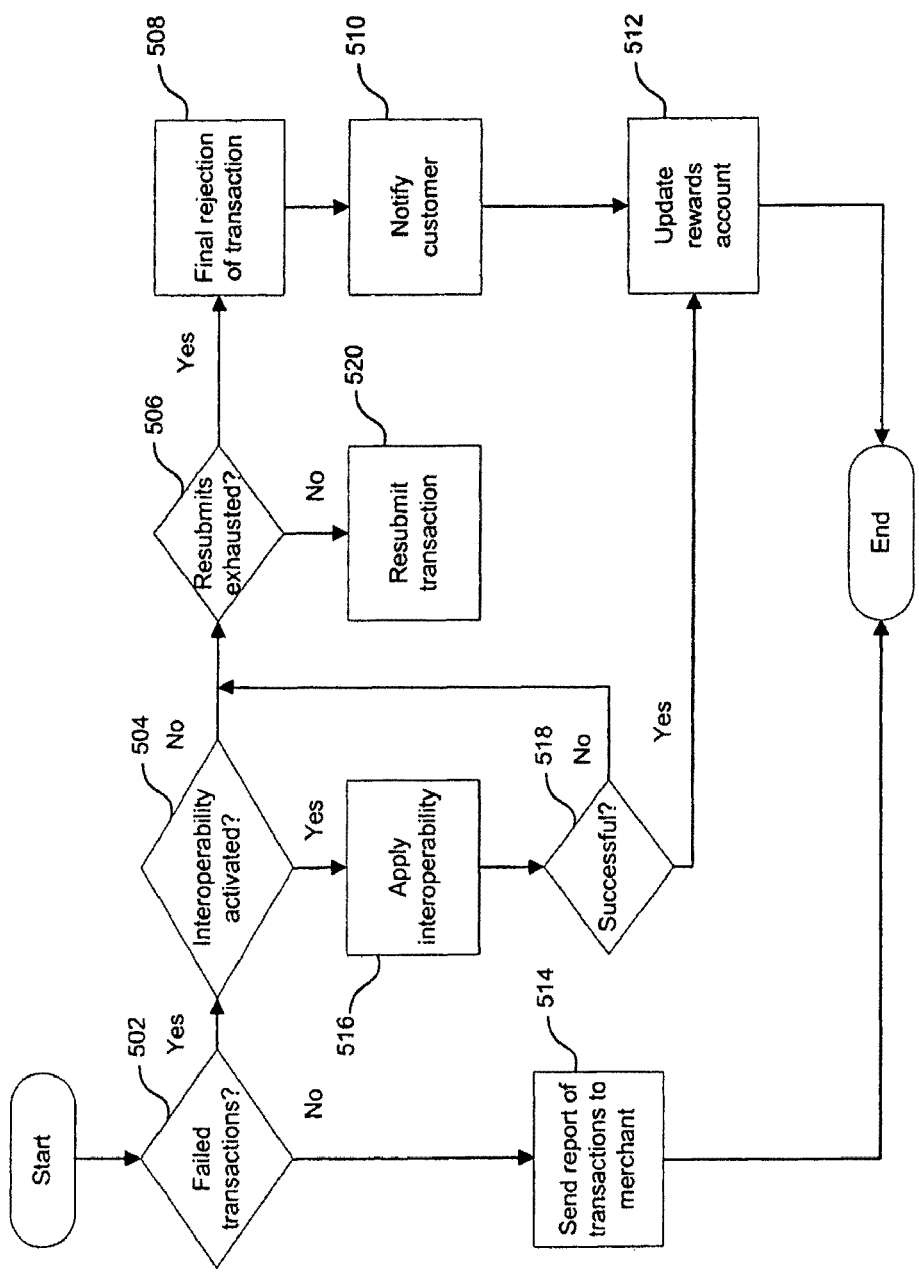
FIG. 5 is an example flow diagram for settling transactions made with a debit function of a user operation vehicle in accordance with embodiments of the present invention.

FIG. 5 is a flow diagram of a process for settling transactions made with a debit function of a user operation vehicle in accordance with various embodiments of the present invention. In general, debit transactions may be settled in a batch process using an Automated Clearing House (ACH) processor. One ACH processor is the United States Federal Reserve bank. Debit transactions settled using an ACH processor are done in a batch process. The transactions are submitted in batch, and after processing, results are provided to the entity that submitted the transactions. Some transactions may not have been completed (failed), for example, because the account associated with the debit transaction had insufficient funds.

In alternative embodiments, debit transactions may be settled online and immediately in the same manner as credit transactions. In online settlement, the processing of a debit function is equivalent to the processing of a credit transaction. The amount of funds can immediately be checked and interoperability can be applied if there are insufficient funds.

Referring to the example details of FIG. 5, at step 502, it is determined if any failed transactions are in the results returned from the ACH processor. If there are no failed transactions, then a report is sent to each merchant at step 514, corresponding to the transactions that merchant submitted. Otherwise, at step 504, it is determined if interoperability is activated for the debit account associated with the failed transaction. If interoperability is activated, the method proceeds to apply interoperability at step 516. If the application of interoperability was successful, a reward account linked with the user operation vehicle and the debit function is updated. Otherwise, the debit transaction is resubmitted to the ACH processor at step 506 in the same manner as if interoperability was not activated.

If at step 504, it is determined that interoperability is not activated, then an attempt is made to resubmit the transaction to the ACH processor. At step 506, it is determined if the threshold number of resubmits has already been reached. If the transaction can still be resubmitted this is done at step 520. Resubmitting the transaction is similar to submitting a new transaction except it is done at a later time. Resubmitting a transaction may be effective if, e.g., a user has placed additional funds into their account since the last attempt was made to settle the transaction by the ACH processor.

If at step 506 it is determined that the threshold number of resubmits has been reached, then a final rejection is sent at step 508, and a user is notified of the final rejection at step 510. At step 512, the corresponding reward account is updated, for example, by subtracting rewards that had been previously awarded based on the transaction. Alternatively, this step may be unnecessary if rewards are not granted until after settlement for a transaction has been completed, or if no rewards were awarded initially.

At step 508, after a final rejection has been received from the ACH processor, a merchant account can be debited for the amount of the transaction, or a process can be started to obtain the funds from a user. The steps taken may depend on which party to the transaction agreed to bear the risk for a lack of funds.

Generally, interoperability allows separate functions associated with a user operation vehicle to work together. Interoperability may also allow functions associated with related user operation vehicles to interoperate. Overall, the interoperability process allows a second function to provide funds to a first function when the first function is utilized at a point of sale. In addition, the interoperability process can also allow a second function to provide funds to a merchant or other party to a transaction, in the same manner as between functions. The interoperability feature is requested by a user during the application process at step 350. At step 354 a user can enter their own rules for how interoperability should be applied between functions on a user operation vehicle. The feature is then automatically applied to any transaction. Alternatively, the feature can be activated by the user for only certain transactions.

Figure 6:
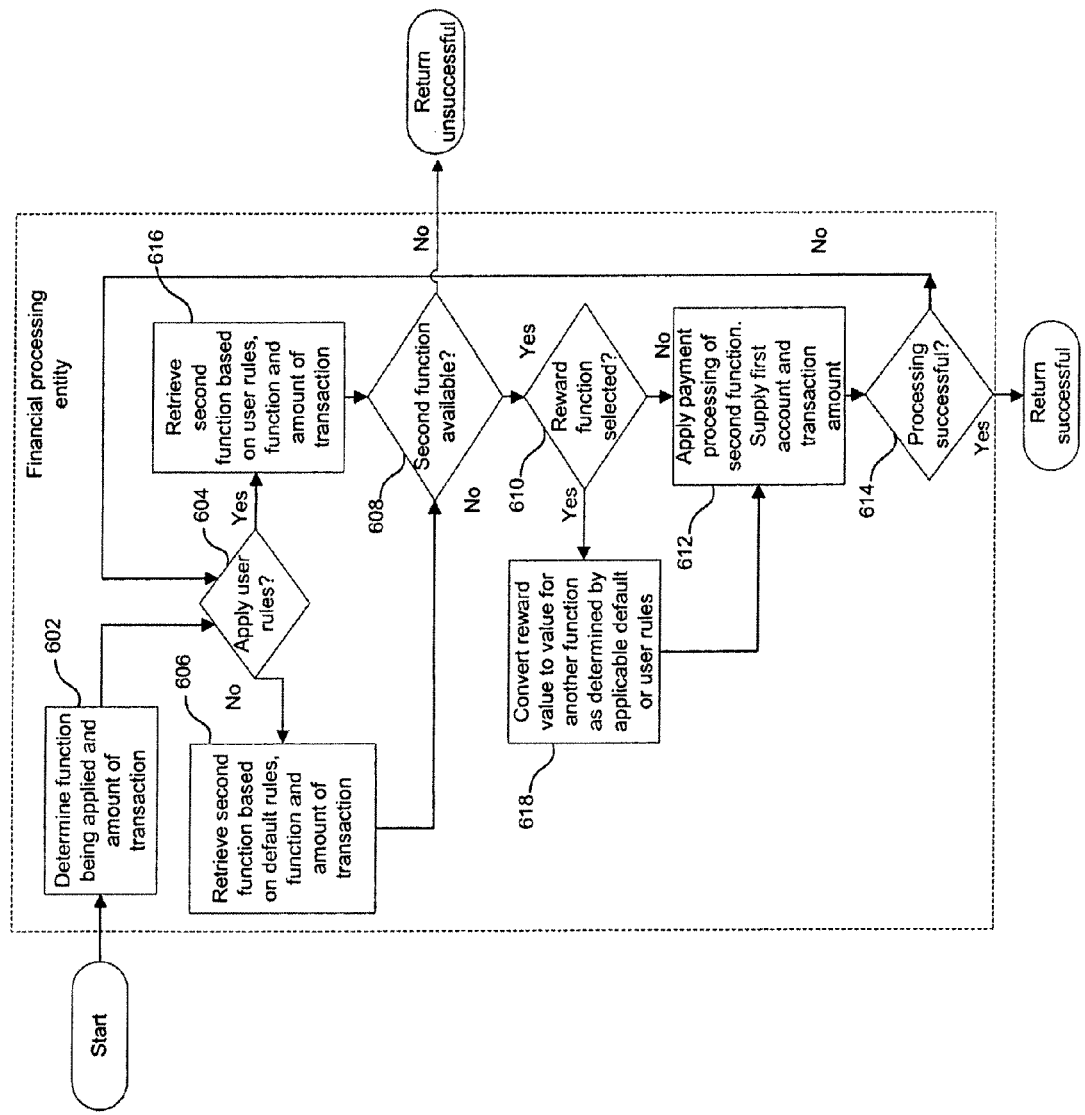
FIG. 6 is an example flow diagram depicting the interoperability between functions of a user operation vehicle in accordance with embodiments of the present invention.

An example application of interoperability is now discussed in conjunction with FIG. 6. Referring to the example details for FIG. 6, at step 602, the first function that was utilized and the amount of the transaction is determined. To apply some of the default and user rules, information about the transaction and/or outside information can be used. This information may vary and can include the amount of the transaction, current interest rates and other details about a function, the amount of funds in a function, or the user of the card (Parents may want usage of the card to be different for their children than for themselves). Using this information, and the default or user rules, a second function can provide funds to a first function. This second function may be provided by a separate user operation vehicle and account. As described above, this allows separate functions or user operation vehicles to work together.

At step 604, it is determined whether to apply the user rules entered at step 354 or default interoperability rules (although various embodiments of the present invention also do contemplate use of a combination of the two). Default rules may be provided by the financial processing entity 108, or by the operator of the user station. Default rules are applied at step 606 and user rules are applied at step 616. The function being applied, along with the other features of the transaction and the default or system rules, determine what second function will be applied in response to utilization of the first function. At step 608, it is determined if the second function is available based on the determination in the previous step. If no second function is available, then the method returns unsuccessful. This situation may occur when all other functions have already been tried and have also returned unsuccessful. If the interoperability is being applied when a first function does not have sufficient funds to complete the transaction, then the above situation may occur when no other functions associated with the user operation vehicle have funds either.

At step 610, if a second function is available, it is determined if it is a reward function. In accordance with the default or user rules, the reward account value may be converted into funds that are applied to a second function.

If at step 610, the second function is not a reward function, then funds associated with the function (or the function itself) determined at steps 616 or 606 is applied to (or substituted for) the first function. Processing a second function at step 612 occurs in the same manner as the processing of any function as described in detail with reference to FIGS. 4A-4D. However, modifications may made to the process to avoid a continuous loop of a function with insufficient funds attempting to find a second function, which in turn also has insufficient funds. For example, one modification may be to maintain "state information" of which functions have already been processed. This can be used to avoid continually processing the same function, as well as offering a simple way to end the interoperability processing.

At step 614, a determination is made as to whether the processing of the second function was successful. If so, the interoperability process returns successful. Otherwise, the method proceeds back to step 604 to choose another function based on either the default or user rules.

Information about a transaction conducted with embodiments of the current invention may be collected from various points of the transaction, for example, at step 414 when a reward function has been activated for a user transaction. As another example, information may be collected at step 438 when a payment record is analyzed. The collected information includes the payment function, the items being purchased, and the time and location of purchase. This information can be collected, with or without a reward function being activated. However, a reward function allows the collected information to be more easily associated with a particular user, especially if the payment type is cash.

The collected information may be analyzed for marketing or logistics purposes. One marketing method that the information may be used with is a self-executing marketing campaign. In a self-executing marketing campaign, a user's transactions are automatically analyzed and a response is made based on this analysis. Responses may be an immediate discount at the point of sale, coupons for future discounts, or adding value to a reward account. For example, a user may wish to purchase 3 items in a transaction, Item A, Item B, and Item C. The items are entered at the point of sale, for example, by scanning a universal product code (UPC) label using a scanner attached to the point of sale. This information is then processed by the marketing campaign rules. For example, a rule may be that if a user purchases Items A and B together, then Item C is 50% off. This discount can then directly be applied to a user's transaction at step 416 above, when the amount of the transaction is determined. This process could be improved by storing and analyzing multiple transactions.

It should be appreciated by those skilled in the art that the present invention also contemplates the use of additional (and alternate) steps and/or items not shown in the figures of the application, and that various steps and/or items in the figures may also be omitted.

In general, it should be appreciated and understood that the specific embodiments of the invention described hereinbefore are merely illustrative of the general principles of the invention. Since numerous modifications and variations will readily occur to those skilled in the art, it is not desired to limit the invention to the exact construction and operation illustrated and described, and accordingly, all suitable modifications and equivalents may be resorted to. Thus, while the foregoing invention has been described in detail by way of The following is claimed:

1. A system for establishing functionality for a user operation vehicle, comprising:
   a selection unit allowing a user to view offered functions and to enter selection information requesting the association of selected functions with the user operation vehicle, wherein the offered functions include a debit function and at least one other type of function other than debit; and
   a financial processing entity in communication with the selection unit, wherein the financial processing entity includes:
   a verifier to receive the selected functions entered by the user through the selection unit and to determine whether the user is authorized to have the selected functions linked with the user operation vehicle;
   a linkage generator configured to link the user operation vehicle with the selected functions when authorization of the selected functions has been determined by the verifier;
   one or more data repositories to store account information corresponding to the selected functions linked to the user operation vehicle by the linkage generator; and
   an account interface unit to perform data layer abstraction, caching, and resource management and to provide an interface between the one or more data repositories, the verifier, and the linkage generator.

2. The system of claim 1, wherein the one or more data repositories include a credit account repository storing account information corresponding to credit functions linked to the user operation vehicle, a debit account repository storing account information corresponding to debit functions linked to the user operation vehicle, a reward account repository storing account information corresponding to reward functions linked to the user operation vehicle, and a prepaid account repository storing account information corresponding to reward functions linked to the user operation vehicle.

3. The system of claim 1, further comprising
   a point of sale to generate transaction information generated by utilization of the user operation vehicle at the point of sale; and
   wherein the financial processing entity is configured to process the transaction information.

4. The system of claim 1, wherein the financial processing entity includes a processor and a memory with instructions to cause the processor to verify the correctness of the transaction information, perform settlement, and provide confirmation of the transaction.

5. The system of claim 1, wherein the financial processing entity is configured to communicate with a third party to perform settlement of debit transactions, credit transactions, reward transactions, and prepaid transactions.

6. A system for establishing functionality for a user operation vehicle, comprising:
   a user station or input medium allowing a user to view offered functions and to enter selection information requesting the association of selected functions with the user operation vehicle, wherein the offered functions include a debit function and at least one other type of function other than debit;
   a verifier to receive the selected functions entered by the user through the user station or input medium and to determine whether the user is authorized to have the selected functions linked with the user operation vehicle; and
   a linkage generator configured to link the user operation vehicle with the selected functions when authorization of the selected functions has been determined by the verifier.

7. The system of claim 6, wherein the user station or input medium allows the user to request interoperability be activated between the selected functions.

8. The system of claim 6, wherein the user station or input medium allows the user to select from a pre-defined set of interoperability rules that have been presented on the user station or input medium.

9. The system of claim 8, wherein the pre-defined set of interoperability rules include group rules relating to a group to which the user belongs or to a specialized parent/child rule set.

10. The system of claim 6, wherein the user station or input medium allows the user to enter user-defined interoperability rules.

11. The system of claim 6, wherein the user station or input medium allows the user to submit one or more related user operation vehicles with additional functions that can be linked with the user operation vehicle.

12. The system of claim 6, wherein the offered function other than debit is selected from a group consisting of a credit function, a prepaid function, and a reward function.

13. The system of claim 6, wherein the offered functions include a retailer function that can only be used at a retailer participating in a payment system associated with the retailer function.

14. The system of claim 6, wherein the user station is a networked computer using a website to interact with the user.

15. The system of claim 6, further comprising:
    a point of sale unit to generate transaction information generated in response to the user selecting one of the linked functions to complete a purchase transaction; and
    a financial processing entity to process the transaction information.

16. The system of claim 6, wherein the user operation vehicle is a smart card or a biometric identifier.

17. A computer-based method establishing the functionality for a user operation vehicle, the method comprising:
    displaying on a user station a list of two or more offered functions that can be selected by a user, wherein the list of two or more offered functions include a debit function and at least one other type of function other than debit;
    sending, from the user station to a financial processing entity, a request to provide the user operation vehicle with at least one of the two or more offered functions selected by the user; and
    receiving at the user station a linking status of the user operation vehicle, wherein the linking status includes a confirmation on the status of the at least one of the two or more offered functions selected by the user.

18. The computer-based method of claim 17, wherein the list of two or more offered functions includes two or more debit functions, two or more credit functions, two or more prepaid functions, or two or more reward functions.

19. The computer-based method of claim 17, wherein the functions selected by the user include two or more functions that can interoperate.

20. The computer-based method of claim 17, wherein the method further comprises allowing the user to request interoperability be activated between the selected functions.

21. The computer-based method of claim 17, wherein the method further comprises displaying on the user station a pre-defined set of interoperability rules for the user to select.

22. A computer-based method establishing the functionality for a user operation vehicle, the method comprising:
- sending, to a user station or input medium, a list of two or more offered functions that can be selected by a user, wherein the list of two or more offered functions include a debit function and at least one other type of function other than debit;
- receiving, from the user station or input medium, a request to provide the user operation vehicle with at least one of the two or more offered functions selected by the user; and
- linking the user operation vehicle with the at least one of the two or more offered functions selected by the user.

23. The computer-based method of claim 22, further comprising:
- transferring the request to a verifier, wherein the verifier determines that the at least one of the two or more offered functions are authorized to be linked to the user operation vehicle; and
- wherein only functions determined to be authorized by the verifier are linked to the user operation vehicle.

24. The computer-based method of claim 23, wherein the verifier uses a pre-determined set of rules to determine that the at least one of the two or more offered functions are authorized to be linked to the user operation vehicle.

25. The computer-based method of claim 22, wherein the list of two or more offered functions includes a debit function and at least one of a credit function and a prepaid function.

26. The computer-based method of claim 22, wherein the list of two or more offered functions include functions selected from a group consisting of a debit function, a credit function, a prepaid function, and a reward function.

27. The computer-based method of claim 22, wherein the list of two or more offered functions include two or more debit functions, two or more credit functions, two or more prepaid functions, or two or more reward functions.

28. The computer-based method of claim 22, wherein the functions selected by the user include two or more functions that can interoperate.

29. The computer-based method of claim 22, wherein the method further comprises allowing the user to request interoperability be activated between the functions selected by the user.

30. The computer-based method of claim 22, wherein the method further comprises presenting on the user station or input medium a pre-defined set of interoperability rules for the user to select.

31. The computer-based method of claim 30, wherein the pre-defined set of interoperability rules include group rules relating to a group to which the user belongs or to a specialized parent/child rule set.

32. The computer-based method of claim 22, wherein the method further comprises receiving a user-defined interoperability rule from the user.

33. The computer-based method of claim 22, wherein the method further comprises receiving information regarding one or more related user operation vehicles with additional functions to be linked with the user operation vehicle.

34. A processing system for setting up a multi-function user operation vehicle, the processing system comprising:
- a verifier to verify that one or more selected functions selected by a user for association with the multi-function user operation vehicle are authorized to be associated with the multi-function user operation vehicle, wherein the one or more selected functions have been selected from an offering of functions that include a debit function and at least one other type of function other than debit;
- a linkage generator to link to the multi-function user operation vehicle with the selected functions that have been authorized by the verifier; and
- one or more data repositories to store account information corresponding to the functions linked to the multi-function user operation vehicle by the linkage generator.

35. The processing system of claim 34, wherein the one or more data repositories include a credit account repository storing account information corresponding to credit functions linked to the multi-function user operation vehicle, a debit account repository storing account information corresponding to debit functions linked to the multi-function user operation vehicle, a reward account repository storing account information corresponding to reward functions linked to the multi-function user operation vehicle, and a prepaid account repository storing account information corresponding to reward functions linked to the multi-function user operation vehicle.

36. The processing system of claim 34, further comprising
- a point of sale to generate transaction information generated by utilization of the multi-function user operation vehicle at the point of sale; and
- a financial processing entity to process the transaction information.

37. The processing system of claim 36, wherein the financial processing entity includes a processor and a memory with instructions to cause the processor to verify the correctness of the transaction information, perform settlement, and provide confirmation of the transaction.

38. The processing system of claim 36, wherein the financial processing entity includes a processor and a memory with instructions to cause the processor to communicate with a third party to perform settlement of debit transactions.

39. The processing system of claim 36, wherein the financial processing entity manages communication between the verifier and the linkage generator.

40. The processing system of claim 34, wherein the linkage generator links the multi-function user operation vehicle with the selected functions by creating or updating a user account on the one or more data repositories.

41. The processing system of claim 34, further comprising an account interface unit to provide an interface between the one or more data repositories, the verifier, and the linkage generator.

42. The processing system of claim 41, wherein the account interface unit is operable to perform data layer abstraction, caching, and resource management.

43. The processing system of claim 34, wherein the linkage generator collects and stores account information about the multi-function user operation vehicle.

44. The processing system of claim 43, wherein the linkage generator stores on the multi-function user operation vehicle at least part of the account information corresponding to the linked functions.

45. The processing system of claim 34, wherein the multi-function user operation vehicle includes a memory, and wherein the linkage generator stores on the memory at least part of the account information corresponding to the linked functions.

46. The processing system of claim 34, wherein the verifier is in communication with a user station or an input medium that allows the user to view a set of offered functions and to enter selection information requesting the association of selected functions with the multi-function user operation vehicle.

47. A system for establishing functionality to a user operation vehicle, comprising:
- a selection means for allowing a user to enter selection information for requesting the association of two or more functions with the user operation vehicle;
- a verification means for determining whether any of the two or more functions are authorized to be associated with the user operation vehicle; and
- a means for associating any of the two or more functions with the user operation vehicle when a determination is made that any of the two or more functions are authorized.

48. The system of claim 47, wherein the two or more functions include functions selected from a group consisting of a debit function, a credit function, a reward function, and a prepaid function.

49. The system of claim 47, further comprising:
- a means for storing account information corresponding to the functions associated to the user operation vehicle by the means for associating any of the two or more functions with the user operation vehicle; and
- an interface means for performing data layer abstraction, caching, and resource management and for providing an interface between the means for storing account information, the verification means, and the means for associating any of the two or more functions with the user operation vehicle.

50. The system of claim 47, wherein the means for associating any of the two or more functions with the user operation vehicle includes a processor operable to execute instructions stored in a memory and the instructions causing the processor to receive information regarding functions authorized to be associated to the user operation vehicle and to link the functions to the user operation vehicle.

51. The system of claim 47, further comprising:
- a means for generating transaction information after the utilization of the user operation vehicle; and
- a means for processing the transaction information.

52. A system for processing a user operation vehicle with multiple payment functions each associated with a unique personal identification number (PIN) comprising:
- a point of sale configured to receive identification information identifying the user operation vehicle, wherein upon receiving the identification information the POS requests entry of one of the unique PINs associated with one of the multiple payment functions;
- a financial processing entity configured to receive the identification information and the unique PIN entered at the point of sale, wherein the financial processing entity determines the payment function associated with the unique PIN that was received and uses the determined payment function to process a transaction.

53. The system of claim 52, wherein each unique PIN includes a common portion and a unique portion.

54. The system of claim 52, wherein the point of sale also generates transaction information that is transferred to the financial processing entity, and wherein the financial processing entity includes a processor and a memory with instructions to cause the processor to verify the correctness of the transaction information, perform settlement, and provide confirmation of the transaction.

55. The system of claim 52, wherein the financial processing entity is configured to communicate with a third party to perform settlement of debit transactions, credit transactions, reward transaction, and prepaid transactions.

56. The system of claim 52, wherein the financial processing entity manages communication between a verifier and a linkage generator.

57. The system of claim 56, wherein the linkage generator links the user operation vehicle with the selected functions by creating or updating a user account on one or more data repositories that store account information corresponding to the functions linked to the user operation vehicle by the linkage generator.

58. The system of claim 52, wherein the financial processing entity further comprising an account interface unit to provide an interface between one or more data repositories, a verifier, and a linkage generator.

59. The system of claim 58, wherein the account interface unit is operable to perform data layer abstraction, caching, and resource management.

\* \* \* \* \*